United States Patent [19]

Anthony

[11] Patent Number: 4,515,816

[45] Date of Patent: May 7, 1985

[54] PROCESSING OF LIGNOCELLULOSE MATERIALS

[75] Inventor: Wilson B. Anthony, Riesel, Tex.

[73] Assignee: Agro-Systems, Inc., Muscle Shoals, Ala.

[21] Appl. No.: 469,131

[22] Filed: Feb. 23, 1983

[51] Int. Cl.$^3$ .................................................. A23K 1/22
[52] U.S. Cl. ...................................... 426/69; 426/626; 426/807; 426/636
[58] Field of Search .................. 426/54, 69, 626, 636, 426/807

[56] References Cited

U.S. PATENT DOCUMENTS

| | | | |
|---|---|---|---|
| 2,162,922 | 6/1939 | Schmidt | 426/54 |
| 2,431,371 | 11/1947 | Coates | 426/54 |
| 3,873,728 | 3/1975 | Moore | 426/636 |
| 3,873,733 | 3/1975 | Moore | 426/636 X |
| 3,937,845 | 2/1976 | Han et al. | 426/69 X |
| 3,939,286 | 2/1976 | Jelks | 426/636 |
| 4,048,341 | 9/1977 | Lagerstrom et al. | 426/636 X |
| 4,064,276 | 12/1977 | Conradsen et al. | 426/636 X |
| 4,082,859 | 4/1978 | Katzen | 426/636 |
| 4,182,780 | 1/1980 | Lagerstrom et al. | 426/626 X |
| 4,369,199 | 1/1983 | Katzen | 426/626 X |

Primary Examiner—R. B. Penland
Attorney, Agent, or Firm—Cushman, Darby & Cushman

[57] ABSTRACT

Lignocellulose-containing materials are chemically converted to a form which is suitable for feeding to ruminant animals by wetting the materials with dilute acid, storing the wet material at ambient temperature and pressure in a low acid environment to effect mild hydrolysis of the materials, drying the acidified materials and partially neutralizing the dried material with ammonia.

11 Claims, 1 Drawing Figure

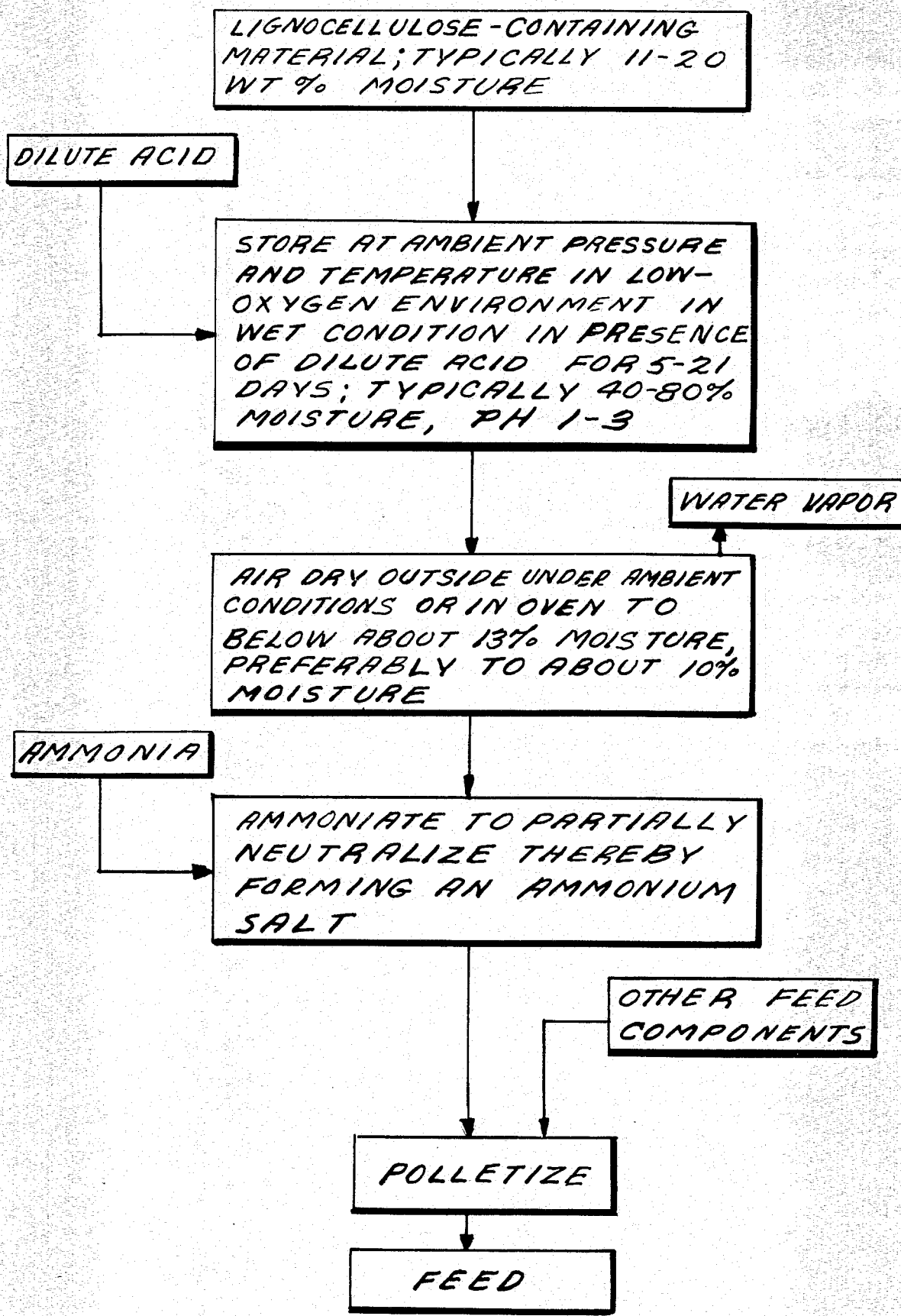

PROCESSING OF LIGNOCELLULOSE MATERIALS

This invention relates to chemical processes for treating lignocellulose-containing materials to render the same suitable for a ruminant animal feed supplement.

BACKGROUND OF THE INVENTION

It is well recognized that lignocellulose materials are not easily digested and assimilated by ruminant animals. The accepted reason for this is that the lignin content and distribution in such plant material binds the cellulose and hemicellulose in the naturally occurring plant material thereby forming a cementing material between the cells. The digestive organs of ruminant animals cannot break down this cementing material and therefore the cellulose content of the plant material does not become available to the animals.

Processes have therefore been developed for chemically converting lignocellulose materials into more digestible form, these processes being directed toward breaking down the lignincellulose bonds. Conversion processes which include an acid treatment of raw lignocellulose material are described in U.S. Pat. Nos. 3,939,286 and 4,082,859. Conversion processes in which raw lignocellulose material is treated with anhydrous ammonia is described in U.S. Pat. No. 4,064,276.

With respect to the use of poultry litter (cage layer manure) as a feed for ruminants it has long been common practice to incorporate such litter into conventional silage. It has also been suggested that poultry litter alone can be subjected to ensiling. The aforementioned U.S. Pat. No. 4,082,859 mentions that the starting material may be poultry litter.

SUMMARY OF THE INVENTION

According to the broad principles of the present invention lignocellulose-containing materials (this term including various organic field wastes and by-products thereof such as poultry litter) are treated by the steps of storing the material under ambient conditions of temperature and pressure in the presence of an acid in a low oxygen environment in a closed container for a period of time sufficient to effect mild hydrolysis of the material, usually 5-21 days, and drying the wet acidified mass thereby enhancing the effect of the acid on the mass. In most cases, the dried mass will be partially neutralized with ammonia.

It has been found that the acid hydrolysis reaction is greatly enhanced, in terms of breaking up the structure of the lignocellulose structure and increasing nutrient value, by drying the acid-wetted, ensilaged material prior to neutralization. This sequence is therefore very important converting lignocellulose-containing materials to ruminant feed.

The ammoniation step increases the apparent crude protein content of the hydrolyzed material by adding nitrogen, as a result of the reaction between the ammonia and the acid to form an ammonium salt. The salt is useful to ruminant animals as a partial substitute for dietary protein. The final product may be a silage or a dried and pelleted product.

The starting material may be essentially any organic lignocellulose-containing waste material such as wet or dry forages, crop residues, woody plants and poultry litter. Further examples are given in the aforesaid U.S. Pat. No. 3,939,286. The material may be in the form of air dry (chopped or unchopped) material or a green material such as field chopped silages. The moisture content of the starting material will vary considerably. Air-dried forage material may have a moisture content of about 11% by weight, whereas green material has a considerably higher moisture content.

No special equipment is required for the process. The storage step is carried out in a low-oxygen environment in any conventional closed container such as a large polyethylene bag (silobag) which has general usage in agriculture for providing a suitable structure for silage. Such bags may typically have a filled length of 140 feet. Conventional equipment for compacting the material in the bag (silobag) may be employed. The only storage requirement is that the material be in a closely confined area and that the oxygen level be controlled. Since acid is added to the material, the container or its liner must be resistant to reaction with the acid.

The preferred acid used for the hydrolyzing step is sulfuric acid, added to the lignocellulose-containing material as a dilute aqueous solution containing about 1.5 to 2.5 weight percent acid. Other mineral acids capable of hydrolyzing the material, such as hydrochloric, phosphoric and sulfurous, may also be used.

The drying step, which is employed as a separate step after storage and before neutralization, can be an air drying step requiring only dispersal of the wet, stored material so as to be exposed to ambient air. Ambient drying time will depend in part on ambient humidity conditions and may be several days or considerably longer. More rapid drying may be effected in an oven, but in general slow drying is preferred. As indicated previously the drying step is important to break down the lignincellulose bond and free the cellulose. One reason for this is that as the moisture evaporates, the effect of the acid on the material becomes more pronounced, this being a result of the concentration of the acid within the plant substance thereby enhancing the oxidation effect of the concentrated acid on the plant substance. By drying is meant the reduction of the water content of the material to less than about 13% by weight preferably to about 10% by weight.

The ammoniation step partially neutralizes the acid-treated material and adds nitrogen by reaction of the ammonia with the acid. The pH of the ammoniated product is generally in the range 4.5-5.5. The ammoniation reaction forms an ammonium salt which is useful to ruminants as a partial substitute for dietary protein. The final product may be a silage or a dried and pelleted product.

BRIEF DESCRIPTION OF THE DRAWING

The sole FIGURE is a flow sheet illustrating the steps of the process of the invention.

DETAILED DESCRIPTION

The flow sheet illustrates the principles of the invention as described in general terms above. The following is a more detailed discussion of the several process steps.

Reference is first made to the acid storage treatment of lignocellulose-containing material. The starting material, for example, chopped air dry forage, is placed in a storage vessel such as a polyethylene bag using conventional equipment to compact the material in the bag. The nature of the vessel is not important so long as the vessel can be closed so as to exclude air during the acid storage period. The material of construction of the vessel should of course be resistant to attack by the acid. Typically the dilute acid will be added to the storage vessel after the latter has been filled with the starting material, but the acid can be added to the starting material before it is placed in the vessel. If a bag is used as the vessel it is convenient to inject the acid at a number of locations along the length of the bag. A typical bag may be 140 feet in length when filled; the total volume of acid to be injected can be divided into 14 portions which are pumped into the bag at 14 foot intervals. When added in this fashion, the dilute acid will rapidly equilibrate thoughout the stored mass. There is little or no temperature rise in the mass during storage.

Sulfuric acid is the preferred acid. For the hydrolysis reaction to proceed properly under ambient temperature and pressure the sulfuric acid must be a dilute aqueous solution of about 1.5 weight % to about 5 weight %. In general, if the acid is too dilute the reaction will not progress and if the acid is too concentrated charring of the lignocellulose material on drying may result. When drying is the final step prior to ammoniation or use, a 2% acid level is adequate, because during the drying step the acid has its greatest effect upon the fiber structure of material. When the concentration approaches 5% there is likely to be some charring of material upon drying. The lowest acid concentration commensurate with the end goal (high digestibility) should be used in order to prevent charring and to keep a low sulfur content in the final product. In general, it is preferred to use 1.5% to 2% acid.

For the reaction to progress properly the reaction mass must be wet (about 40% to 80% by weight water) and as the starting material is often dry it is important that the water environment be provided by the acid. The amount of water used to carry the acid may vary widely; a range may be 860 pounds to 3100 pounds of liquid added per ton of air dry forage. About 1000 pounds of 1.5–2.0% acid per ton of air dry forage is suitable for producing a wet reaction mass.

The amount of concentrated acid should be about 1.5% to 2.5% by weight of the dry weight of the starting material. The pH of the acid-wetted mass will generally be in the range of 1 to 3.

The minimum reaction time (holding time) is that period of time sufficient to effect substantial disruption of the lignin-cellulose bonds. Typically this will be at least about 5 days and up to about 21 days, depending on the ambient temperature. At high ambient temperature the rate of reaction is greater than at low ambient temperature. Freezing of the mass should be avoided as this would result in a low reaction rate.

Next, the acid-stored wet material is dryed before it is ammoniated. The drying step should reduce the moisture content to about 13% by weight and preferably about 10% by weight. This is accomplished in any convenient way, such as by removing the material from the storage vessel and spreading it so as to dry by sunlight and natural circulation of ambient air or by drying in a drum, using forced hot air to remove water vapor. Sun drying is slower and is preferred because it has been found that the effect of the acid on the lignocellulose material is enhanced as the water content of material is reduced. While the same enhancement will be present during oven drying, this form of drying is generally more rapid than air drying and hence the acid-enhancement time is likely to be shorter with oven drying.

The thus-dried mass is then placed in a suitable reactor vessel and partially neutralized with ammonia making sure that the ammonia permeates uniformly throughout the mass. An adequate amount of ammonia is ¼ pound of anhydrous ammonia per pound of acid used in the acid-storage step. The pH of the ammoniated product should be in the range of about 4.5 to 5.5. The neutralization reaction forms an ammonium salt which can be assimilated by ruminants.

Generally the ammoniation and partial neutralization is carried out with anhydrous ammonia, either gas or liquid, but it is also suitable to use aqueous ammonia.

The dry, partially hydrolyzed, ammoniated product produced with anhydrous ammonia is suitable as a feed supplement for ruminants. The product can be pelletized as is, after further grinding if necessary. Preferably it is fed to the die chamber of a pellet mill in metered proportion to one or more other feed components with the result that the final pellets can be fed directly to the animals. The moist product produced with aqueous ammonia is suitable as is, as a feed supplement.

When the treatment process is properly carried out, the fiber component of the final product will be materially lowered and the crude protein equivalent materially increased. In a typical example mature rye grass forage before mild acid hydrolysis had a neutral detergent fiber (NDF) content of 63.2%. After ensiling 21 days at ambient temperature and pressure with a 2% sulfuric acid solution, in an amount to give 1.5 to 2.0% concentrated per ton of forage, the NDF was reduced to 34.84%. In another example, a sample of oat head forage was divided into two parts, one of which was ensiled with water and the other part ensiled for the same time period with sulfuric acid within the concentration range and amount specified above. After drying, part of the acid-treated forage was further treated with aqueous ammonia and redried. The results from laboratory analyses revealed that the control forage (ensiled with water) contained 5.13% of protein and 71.32% of NDF. The acid-treated forage contained 7.45% protein and only 38.37% NDF. The acid-treated forage that was ammoniated contained 16.17% crude protein and 30.27% of NDF. These data reveal the major effect of mild acid hydrolysis on NDF and the value of ammoniation for increasing the crude protein equivalent.

I claim:

1. A process for treating lignocellulose-containing material to render it amenable to digestion by ruminant animals comprising: adding dilute aqueous acid to the material to form a wet mass in which the pH is in the range of about 2–3, the concentration of the added acid being sufficient to effect acid hydrolysis of the lignocellulose-containing material without charring thereof; storing the wet acidified mass in a low oxygen environment in a closed vessel for a time period of about 5 to about 21 days under ambient conditions of temperature and pressure; and drying the wet acidified mass thereby enhancing the effect of the acid on the mass.

2. A process as in claim 1 wherein the dried mass is thereafter neutralized by adding ammonia thereto.

3. A process as in claim 1 wherein the acid is aqueous sulfuric acid of a concentration in the range of about 1.5% to 5% by weight.

4. A process as in claim 3 wherein the amount of concentrated acid is 1.5% to 2.5% by weight of the dry weight of the lignocellulose material.

5. A process as in claim 1 wherein the wet acidified mass is dried to a moisture content of not greater than about 13% by weight.

6. A process as in claim 2 wherein the wet acidified mass is dried to a moisture content of not greater than about 13% by weight and wherein the ammonia is anhydrous ammonia.

7. A process for treating lignocellulose material to render it amenable to digestion by ruminant animals comprising: adding to the lignocellulose dilute aqueous sulfuric acid of strength 2% to 5% by weight in an amount equal to 1.5% to 2.5% of concentrated acid based on the weight of the initial lignocellulose material to thereby form a wet mass containing about 40% to 80% by weight water; storing the wet acidified mass in a closed vessel for a period of about 5 to 21 days under ambient temperature and pressure; drying the wet acidified mass after storage to a moisture content no greater than about 13% by weight; and adding anhydrous ammonia to the thus dried mass in an amount to give the mass a pH in the range 4.5 to 5.5.

8. A two-stage acid hydrolysis process for treating lignocellulose-containing material to render it amenable to digestion by ruminant animals comprising: in a first stage adding to the material dilute aqueous mineral acid selected from the group consisting of sulfuric acid, hydrochloric acid, phosphoric acid and sulfurous acid to form a wet mass containing free liquid, in which mass the pH is in the range of about 2–3, the concentration of the added acid being in a range effective to cause acid hydrolysis of the lignocellulose-containing material without charring thereof and storing the wet acidified mass in a low oxygen environment for a time period of about 5 to about 21 days under ambient conditions of temperature and pressure to thereby effect substantial disruption of lignin-cellulose bonds in the material by acid hydrolysis; and in a second stage drying the wet acidified mass to a moisture content of not greater than about 13% by weight to concentrate the acid within the lignocellulose material by removal of water thereby enhancing the oxidative effect of the concentrated acid on the material and enhancing breakdown of the lignin-cellulose bond and freeing of the cellulose.

9. A process as in claim 8 wherein the drying step is an ambient air drying step carried out by dispersal of the material in ambient air and leaving the dispersed material in contact with the ambient air for at least several days.

10. A process as in claim 9 including the further step of neutralizing the dried material to a pH of 4.5 to 5.5 by adding anhydrous ammonia thereby forming an ammonium salt.

11. A process as in claim 1 wherein said acid is a mineral acid.

* * * * *